United States Patent [19]

Saito

[11] Patent Number: 5,159,510

[45] Date of Patent: Oct. 27, 1992

[54] VIDEO TAPE RECORDER HEAD ULTRASONICALLY VIBRATED TRANSVERSE TO A TRACK TRACED BY THE HEAD

[75] Inventor: Etsuro Saito, Kanagawa, Japan

[73] Assignee: Sony Corporation, Tokyo, Japan

[21] Appl. No.: 682,326

[22] Filed: Apr. 9, 1991

[30] Foreign Application Priority Data

Apr. 13, 1990 [JP] Japan .................................. 2-98593

[51] Int. Cl.$^5$ .......................... G11B 5/41; G11B 5/48; G11B 21/02; G11B 21/16
[52] U.S. Cl. ..................................... 360/109; 360/75; 360/104; 360/128
[58] Field of Search ... 360/109, 75, 10.3, 77.12–77.17, 360/104, 128, 137

[56] References Cited

U.S. PATENT DOCUMENTS

| | | | |
|---|---|---|---|
| 4,327,384 | 4/1982 | Tomita et al. | 360/77.17 |
| 4,426,665 | 1/1984 | Bradford et al. | 360/10.2 |
| 4,507,696 | 3/1985 | Hutter | 360/109 |
| 4,620,256 | 10/1986 | Rubey | 360/137 |
| 4,882,635 | 11/1989 | Sanai | 360/10.2 |
| 4,970,748 | 11/1990 | Rubey | 360/137 |

FOREIGN PATENT DOCUMENTS 2624115 12/1976 Fed. Rep. of Germany .
370253 3/1983 Fed. Rep. of Germany .

*Primary Examiner*—Robert S. Tupper
*Attorney, Agent, or Firm*—Alvin Sinderbrand; William S. Frommer

[57] ABSTRACT

In a video tape recorder, in order to prevent clogging of a head gap without affecting head tracking and tape-to-head fit, a head tip is cantilevered on a rotary drum, and the tip is vibrated ultrasonically in a direction transverse to the direction of the track of the tape.

6 Claims, 5 Drawing Sheets

VIDEO TAPE RECORDER HEAD ULTRASONICALLY VIBRATED TRANSVERSE TO A TRACK TRACED BY THE HEAD

BACKGROUND OF THE INVENTION

1. Field of the Invention

This invention relates to a head drum apparatus for a video tape machine and is particularly concerned with reducing clogging of the head.

2. Description of the Prior Art

Japanese Utility Model application JP-A-23224/1984 discloses a head unit of a video tape recorder which can be vibrated in order to reduce clogging of the head unit. As shown in FIGS. 6 and 7 of the accompanying drawings, the known head unit 12 is mounted on a rotary drum 4 around which is wound a magnetic recording medium in the form of a tape 19. The head unit 12 is provided with a mounting element 13 mounted on the drum 4 by a screw. An exciting element 15 is mounted on the mounting 13, and in turn a head tip 14 is mounted on the exciting element 15. The tip end of the head tip 14 projects slightly from the rotary drum 4 so as to contact the tape 19. The head tip 14 has a head gap, and signals can be read from and written on the tape 19 by the head tip 14.

The exciting element 15 is electrically connected to an ultrasonic signal generator and is arranged so that the head tip 14 is vibrated in a direction radially of the drum, i.e. towards and away from the tape 19 as shown by arrow B in FIG. 7.

The ultrasonically vibrating head tip 14 shakes off foreign matter (mainly, bonding material and magnetic powder separated from the tape) attached thereto, and seeks to prevent read and write failure, or dropout, due to clogging of the head gap.

The resonant frequency of the exciting element 15 is determined by the Young's modulus thereof and the mass of the head tip 14 as a load. Typically, the head tip 14 has a frequency as low as 15 to 20 kHz, and in such case the head tip 14 cannot sufficiently shake off the foreign matter attached thereto. As a result, dropout can still occur in reading or writing of the signals.

Moreover, the head tip 14 vibrates in the direction towards and away from the tape 19. Therefore, problems may arise due to poor tape-contact between the head tip 14 and the tape 19, or a speed error in the rotation of the head. Also the head tip 14 is secured on the exciting element 15 in the form of a piezoelectric element which is unstable in the sense that it tends to shift the position of the head tip 14 with variations in temperature. This can cause tracking errors of the head.

OBJECTS AND SUMMARY OF THE INVENTION

One object of the present invention is to provide a head drum assembly capable of preventing clogging of the head gap and thereby eliminating signal dropout.

Another object of the present invention is to provide such an assembly which does not affect tape-to-head contact, drum rotation, or head tracking.

In accordance with the present invention, the exciting or vibrating device acts on a head mounting element so as to vibrate the mounting element and the head in a direction which is transverse to the track which the head traces on the magnetic tape. Because the head is vibrated transversely of the track, rather than towards and away from the tape, the problems with tape-to-head contact and drum rotation are obviated.

Preferably, the head mounting element is arranged as a cantilever to mount the head on the drum. With such an arrangement, the resonant frequency is considerably greater than that for the known vibration arrangement, which results in better prevention of clogging. Furthermore, with this arrangement, the vibrator device can be arranged so that temperature variations do not cause tracking errors.

Other objects, features and advantages of the present invention will become apparent upon consideration of the following detailed description of a preferred embodiment thereof, especially when considered with the accompanying drawings in which like reference numerals are employed to designate the same or similar components in the different figures.

BRIEF DESCRIPTION OF THE DRAWINGS

FIGS. 1 to 3 show a first embodiment according to the present invention, in which:

FIG. 1 is an exploded perspective view illustrating the mounting of a head unit on a rotary drum, which is shown inverted, FIG. 2 is a section view of FIG. 1, and FIG. 3 is a side view, partially sectioned, of the rotary drum;

FIGS. 4 and 4 show a second embodiment, in which:

FIG. 4 is an exploded perspective view similar to that of FIG. 1, that is, showing the respective head unit inverted.

FIGS. 6 and 7 show the prior art, in which:

FIG. 6 is a plan view of a rotary drum, and

FIG. 7 is a sectional view of FIG. 6.

DETAILED DESCRIPTION OF THE PREFERRED EMBODIMENTS

Figure 3:
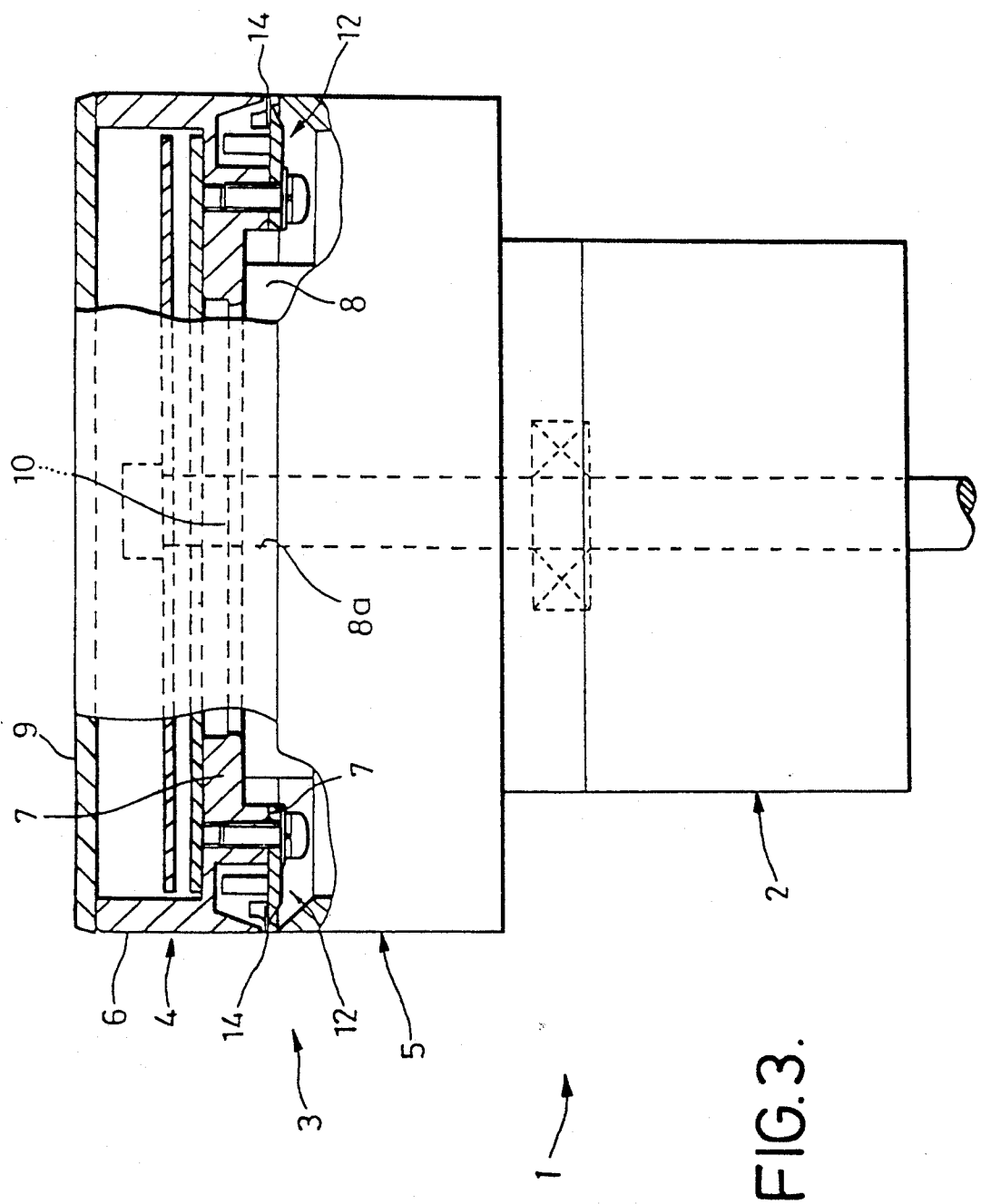

Referring now to FIG. 3, it will be seen that a rotary drum assembly, according to the first embodiment of the present invention, includes a drum support 2 fixed on a chassis (not shown). A drum 3 is supported on the drum support 2 and composed of an upper rotary drum 4 and a lower fixed drum 5. The rotary drum 4 is composed of a drum body 6 of a short cylindrical shape, a flange 7 projecting inwardly from the lower end of the drum body 6, a spindle support 8 fixed on the flange 7, and a cover plate 9 covering an upper surface of the drum body 6. All of the above are secured by screws which are not shown in the drawing. The spindle support 8 is formed at its center with a spindle hole 8a in which a shaft 10 is disposed with a force fit. The lower portion of the shaft 10 passes through the fixed drum 5 and the drum support 2. Ball bearings are arranged between the shaft 10 and the drum support 2, as shown in broken lines at 10a. The rotary drum 4 is supported rotatably by the fixed drum 5 and the drum support 2. Also a plurality of head units 12 (in this embodiment, two) are provided at the underside near the outer circumference of the flange 7 of the drum body 6.

Figure 1:
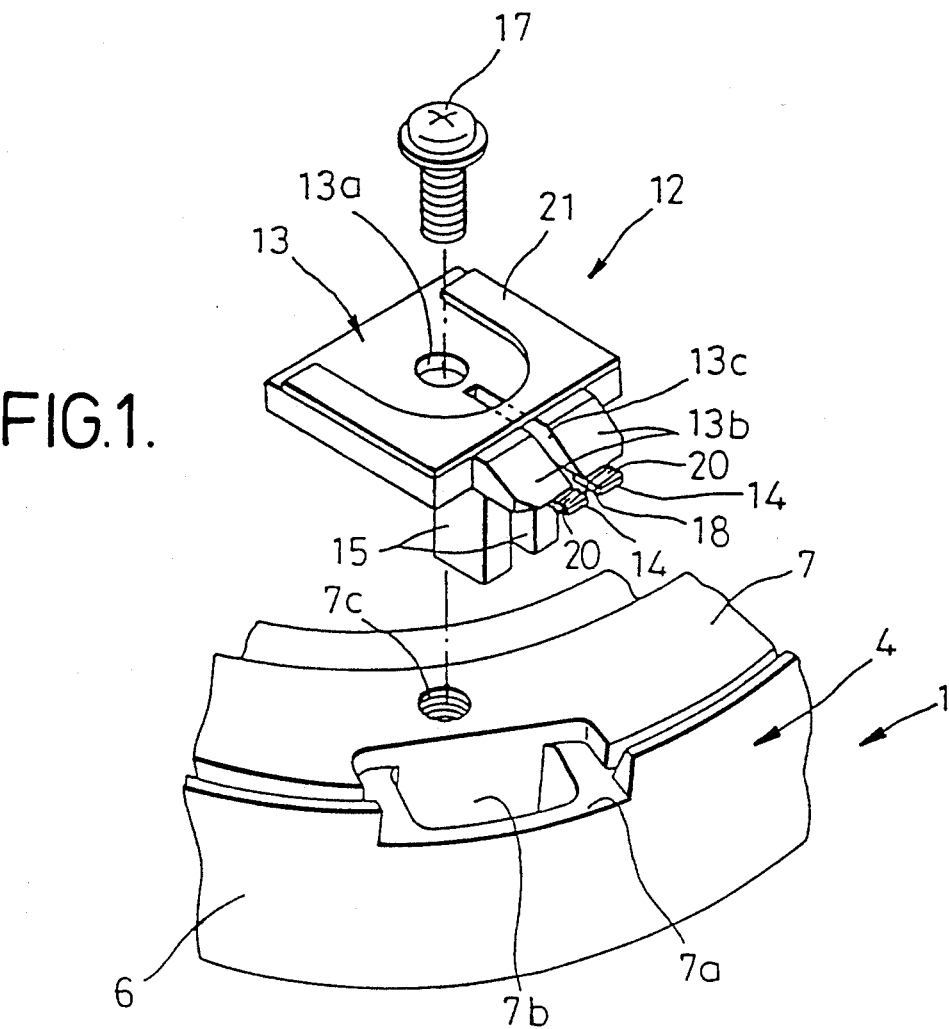
Figure 2:
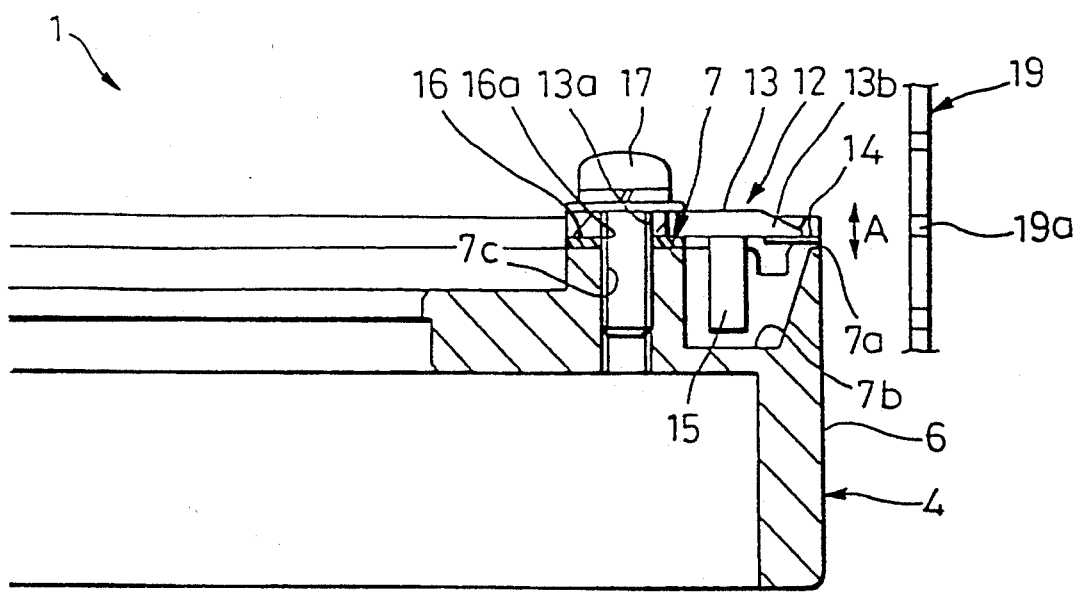

As shown in FIGS. 1 and 2, each head unit 12 includes a head base 13 fixed on the flange 7, head tips 14 extending from the tip end of the head base 13, and exciting or vibrator elements 15 which vibrate the head base 13.

A shallow recess 7a for receiving the head tips 14 is formed in the underside of the outer circumference of the flange 7 of the rotary drum 4. Also, a deeper recess 7b extends upwardly from the shallow recess 7a for receiving the exciting elements 15. Inwardly of the recesses 7a, 7b of the flange 7 is formed a base mounting screw hole 7c.

The head base 13 is formed from a brass plate, with a mount hole 13a in its base end and and on its tip end with a pair of projections 13b on its tip end. The underside of the projections 13b are tapered. A slit 13c is formed in the head base 13, extending from between the projections 13b to the vicinity of the mount hole 13a. The head tips 14 are bonded by a bonding agent to the tip-end, upper surfaces of the projections 13b at opposite sides of the slit 13c. The head tips 14 are wound with coils 20 whose ends are soldered on a contact plate 21 bonded by a bonding agent to the underside of the head base 13. The pair of head tips 14 form a head gap 18 therebetween, which permits reading and writing on a magnetic recording tape 19 with a predetermined track-width.

The exciting elements 15 are layered or laminated piezoelectric elements which are bonded by a bonding agent to the upper surface of the head base 13 at opposite sides of the slit 13b. The layered piezoelectric elements 15 contract and expand with voltage applied thereto so that the tip end portion of the head base 13 is flexurally vibrated in the direction of the arrow A on FIG. 2, that is, in the transverse or width direction of the track 19a scanned by the head tips 14 on of the tape 19. The layered piezoelectric elements 15 are accommodated in the recess 7b.

The head base 13 abuts against the flange 7 of the rotary drum 4 through a washer 16. The head base 13 is secured on the rotary drum 4 by a base mounting screw 17 engaging with the base mounting screw hole 7c, and passing through the through hole 13a of the head base 13 and the through hole 16a of the washer 16. The ends of the head tips 14 protrude slightly from the circumference of the rotary drum 4. By providing of the through hole 13a of the head base 13 with a diameter large than that of the base mounting screw 17, the amount by which the head tip 14 projects relative to the rotary drum 4 can be adjusted by displacement of the head base 13.

Operation of the first embodiment will now be described with reference to FIGS. 1 to 3 as follows.

Figure 6:
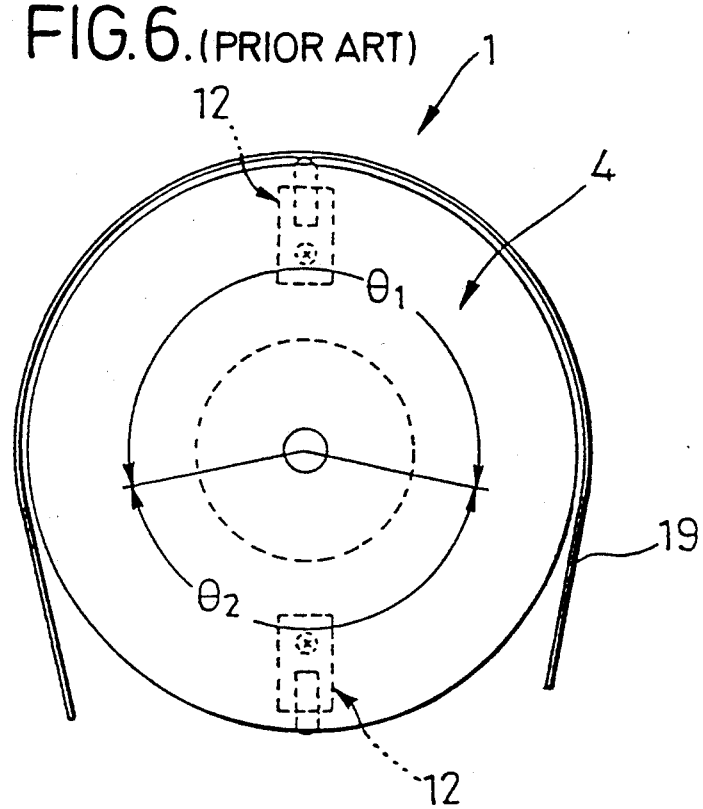
Figure 7:
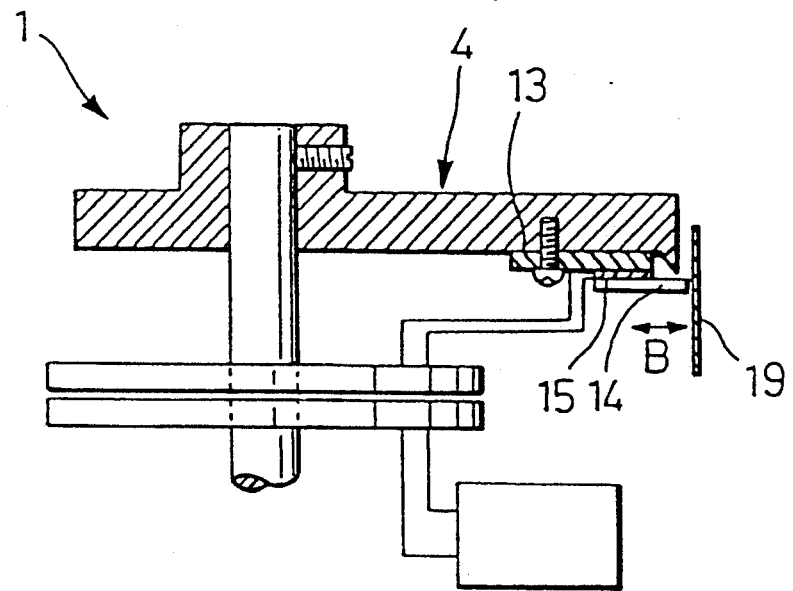

In FIG. 2, and alternating voltage applied thereto, each piezoelectric element 15 expands and contracts ultrasonically in the vertical direction, and the head base 13 vibrates ultrasonically in a direction along the width (arrow A in FIG. 2) of the track 19a of the tape 19. It is to be noted that the head base 13 is fixed at its one end by the base mounting screw 17 to the flange 7 of the rotary drum 4 and is constructed as a cantilever with the head tips 14 at its free end. The resonant frequency of the head base 12 in a flexural or cantilever bending mode is determined by its effective length, thickness, Young's modulus, the piezoelectric element 15 as a load and mass of the head tips 14, etc. These parameters typically produce a resonant frequency is extensively larger (about 200 kHz in this embodiment) than the resonant frequency (about 1 kHz) of the prior art arrangement of FIGS. 6 and 7, thus reducing the amplitude of vibration to as low as 0.5 μm.

Therefore, the head tip 14 vibrates ultrasonically and thus effectively shakes off the magnetic powder or bonding dust which has adhered from the tape 19. In this way the head gap is prevented from clogging.

It is to be noted that, if dropout (failure to record or write) arises due to the clogging phenomenon during overwriting (writing again, on the already recorded tape 19), the previously recorded signal remains as it was on the portion of the tape where dropout occurred and both intended and unwanted signals are recorded together on the same tape. When reproducing such a tape, and if the unwanted signals are reproduced normally, it is not possible to discriminate the dropout, and a compensating or error correcting process cannot be performed during reproduction. The reproduced unwanted signals suddenly change the reproduced picture. With the present embodiment described above, the clogging phenomenon can be reliably eliminated to prevent such sudden picture changes.

Moreover, although the head tips 14 vibrate in the width direction of the track 19a of the tape 19, the width of the track 19a is large, for example from 40 Mm to 50 Mm, relative to the vibration amplitude which is as small as about 0.5 μm. Therefore the effect of the head tip vibration on tracking accuracy is insignificant.

The characteristics or positioning of the piezoelectric elements 15 may vary due to external conditions such as temperature. However, the head tips 14 are fixed directly on the head base 13, and thus are not affected by displacement of the piezoelectric elements 15 so that deterioration in tracking is avoided.

Since head tips 14 vibrate in the width direction of the track 19a relative to the tape 19, the tape 19 always contacts the head tips 14, and there is no adverse affect on tape-to-head contact or fit.

Figure 4:
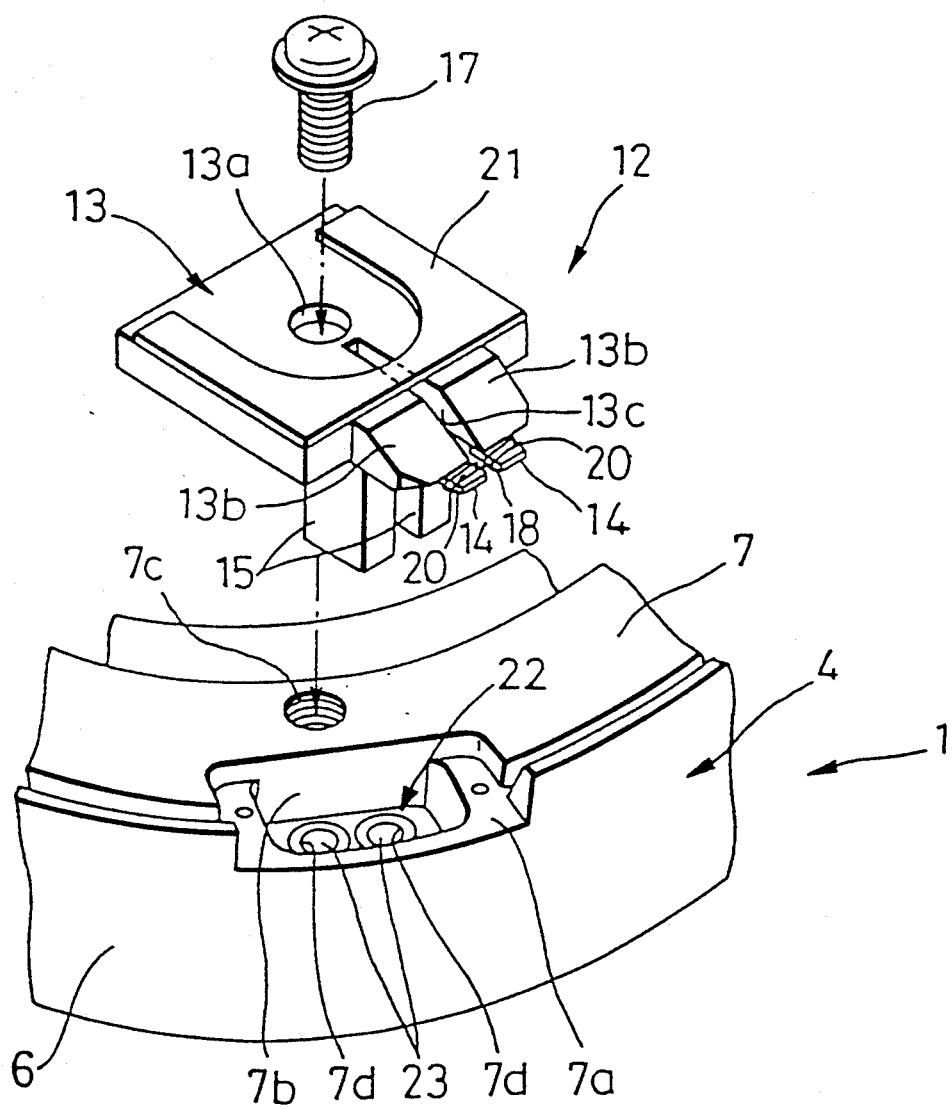
Figure 5:
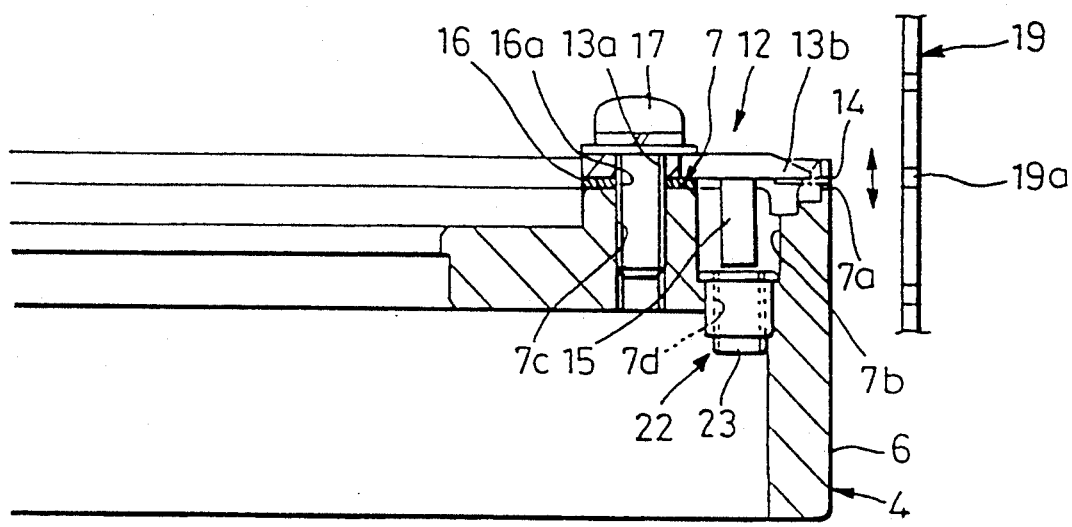
FIG. 5 is a section view of FIG. 4.

The second embodiment of the present invention is shown in FIGS. 4 and 5 to heave the same construction as the first embodiment in many respects. However, in the second embodiment, a step adjuster 22 is provided for adjusting the heights of the head tips 14 of the rotary drum 3, and this is of use when two or more head units are employed.

The step adjuster 22 abuts the upper surfaces of the layered piezoelectric elements 15, in the normal operating orientation of the latter, adjusts the height of the respective head tips 14 by pushing up or even pulling down the layered piezoelectric elements 15. By varying slightly the height of the head tips of the two head units, two tracks can be formed at the same time using only one rotating drum.

In FIGS. 4 and 5, the flange 7 of the rotating drum 4 is provided, within each deeper recess 7b, with two screw holes 7d vertically passing down through the flange 7. Height adjusting screws 23 thredally engage with the screw holes 7d and extend from above the flange 7 into the recess 7b. The lower end surfaces of the height adjusting screws 23 abut on the upper end surfaces of the respective layered piezoelectric elements 15.

With this arrangement, the heights of the head tips 14 of the head units can be varied by removing the cover plate 9 (shown in FIG. 3) of the rotary drum 4 and by turning the heads of the height adjusting screw 23 using a G driver from above the rotating drum. The step adjustment can thus be performed easily.

In the second embodiment described above, the height adjusting screws are used for step adjustment. However, adjustment can be realized without using such height adjusting screws. That is, the construction may be modified such that height adjustment is provided by making the upper surfaces of the layered piezoelectric elements 15 abut on the upper surfaces of the respective deep recesses 7b, and making the layered piezoelectric elements 15 expand or contract by applying a desired d-c voltage thereto. With such a constitution, the manufacturing process becomes much easier and the number of parts and assembling man-hours are reduced.

The modification shown in FIG. 8 will now be described. This modification may be applied to either of the two previously described embodiments. As shown, each head tip 14 comprises a pair of portions 14a,14b, around each of which a respective portion of each coil 20 is wound. Each pair of head tip portions defines a gap therebetween, and, as is known, the gaps may extend in directions G which are inclined at angles of 75° and 105° relative to the direction T of the track on the tape. With such a configuration, the exciting elements 15 are mounted on the head base 13 and the head tips are cantilevered such that, the directions of vibration A are inclined at approximately the same angle (75° or 105° relative the track direction T) as the respective head tip gap (directions G). By virtue of this configuration, time-base errors (which could otherwise occur if the head tips are vibrated in a direction other than the gap direction) can be eliminated.

Figure 8:
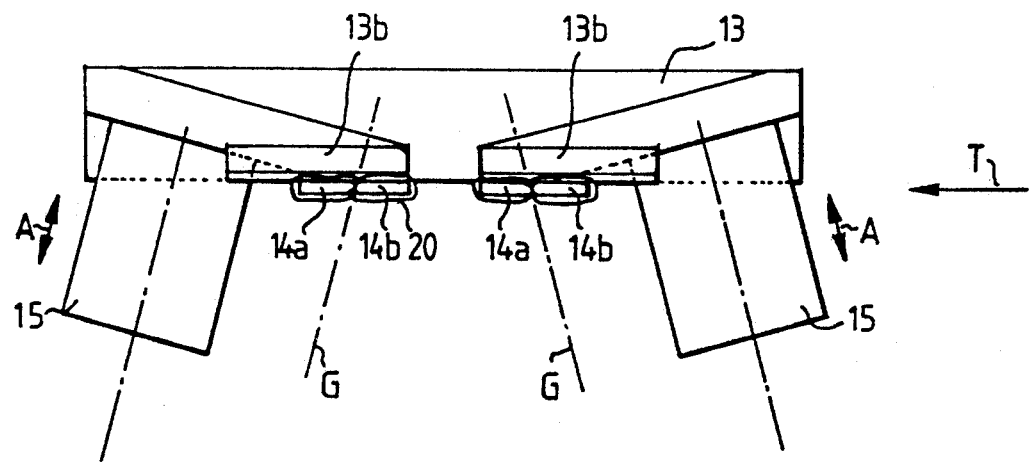
FIG. 8 is an end view of a modified head tip.

In the case where the modification of FIG. 8 is applied to the second embodiment of FIGS. 4 and 5, the adjusting screws 23 may be arranged to be inclined similarly, so that the screws 23 are coaxial with the respective exciting elements 15.

Having described preferred embodiments of the invention with reference to the accompanying drawings, it is to be understood that the invention is not limited to the precise embodiments and that various changes and modification thereof may be effected by one skilled in the art without departing from the spirit or scope of the invention as defined in the appended claims.

What is claimed is:

1. A head drum assembly for a video tape apparatus, comprising:
   a rotary drum around which a magnetic tape can be wound;
   a head mounting element mounted on said drum;
   at least one transducing head mounted on said mounting element for tracing a track of a predetermined width on said magnetic tape during rotation of said drum; and
   means acting on said mounting element for vibrating the mounting element and thereby the respective transducing head at an ultrasonic frequency in a direction transverse to said track and with an amplitude of vibration or approximately 1/100 of said track width so as to prevent clogging of the transducing head.

2. A head drum assembly according to claim 1, wherein said mounting element has a first portion which is mounted on said drum and a second portion cantilevered relative to said first portion and on which said transducing head is mounted, said means for vibrating acting on said mounting element part-way between said first and second portions thereof.

3. A head drum assembly according to claim 1, further comprising adjustment means, and wherein said means for vibrating has a first end acting on said mounting element and a second end acted on by said adjustment means, whereby the adjustment means can adjust the head in a direction transverse to said track.

4. A head drum assembly according to claim 1, wherein said means for vibrating comprises a piezoelectric element, the apparatus further comprising means for energizing the piezoelectric element at said ultrasonic frequency.

5. A head drum assembly according to claim 4, wherein the piezoelectric element has a firs end acting on said mounting element and a second end mounted stationarily with respect to said drum, the means for energizing further including means for applying a DC bias signal to said piezoelectric element, said DC bias signal being adjustable thereby to adjust said transducing head in a direction transverse to said track.

6. A head drum assembly according to claim 1, wherein each said transducing head comprises two head portions defining therebetween a head gap which extends in a direction inclined at an angel relative to said track, and wherein said means for vibrating is arranged so as to vibrate the respective at least one transducing head in said direction of said head gap.

* * * * *